United States Patent [19]

Jalali et al.

[11] Patent Number: 5,828,662
[45] Date of Patent: Oct. 27, 1998

[54] MEDIUM ACCESS CONTROL SCHEME FOR DATA TRANSMISSION ON CODE DIVISION MULTIPLE ACCESS (CDMA) WIRELESS SYSTEMS

[75] Inventors: Ahmad Jalali, Plano, Tex.; Witold Krzymien, Edmonton; Paul Mermelstein, Cote St. Luc, both of Canada

[73] Assignee: Northern Telecom Limited, Quebec, Canada

[21] Appl. No.: 666,828

[22] Filed: Jun. 19, 1996

[51] Int. Cl.⁶ .................................................. H04B 7/216
[52] U.S. Cl. ............................................................. 370/335
[58] Field of Search ..................................... 370/320, 321, 370/324, 335, 337, 342, 347, 350, 441; 455/422

[56] References Cited

U.S. PATENT DOCUMENTS

| | | | |
|---|---|---|---|
| 5,257,257 | 10/1993 | Chen et al. | 370/18 |
| 5,260,967 | 11/1993 | Schilling | 370/342 |
| 5,295,152 | 3/1994 | Gudmundson et al. | 375/1 |
| 5,309,474 | 5/1994 | Gilhousen et al. | 375/206 |
| 5,394,391 | 2/1995 | Chen et al. | 370/18 |
| 5,511,067 | 4/1996 | Miller | 370/335 |
| 5,586,120 | 12/1996 | Cadd | 370/468 |
| 5,603,081 | 2/1997 | Raith et al. | 455/435 |
| 5,604,730 | 2/1997 | Tiedemann, Jr. | 370/252 |
| 5,640,414 | 6/1997 | Blakeney, II et al. | 375/200 |
| 5,673,259 | 9/1997 | Quick, Jr. | 370/342 |

FOREIGN PATENT DOCUMENTS

| | | | |
|---|---|---|---|
| 0 564 937 A1 | 10/1993 | European Pat. Off. | H04B 7/26 |
| 0 592 209 A1 | 4/1994 | European Pat. Off. | H04B 7/26 |
| 0 678 991 A2 | 10/1995 | European Pat. Off. | H04J 13/00 |
| PCT/FI95/ 00296 | 12/1995 | WIPO . | |

OTHER PUBLICATIONS

Alfred Baier, Open Multi–Rate Radio Interface Architecture Based on CDMA, Phillips Kommunikations Industrie AG, Nurnberg, Germany, ICUPC '93, IEEE 1993, pp. 985–989.

An Overview of the Application of Code Division Multiple Access (CDMA) to Digital Cellular Systems and Personal Cellular Networks, Qualcomm inc., Jun. 4, 1992, pp. 1–56.

*Primary Examiner*—Ajit Patel
*Attorney, Agent, or Firm*—Finnegan, Henderson, Farabow, Garrett & Dunner, L.L.P.

[57] ABSTRACT

A synchronous discontinuous transmission medium access control (SDTX-MAC) method and apparatus for more efficiently using existing uplink channels by sharing these uplink channels between multiple terminals engaged in bursty data transmission. This is accomplished by assigning each mobile terminal an individual time slot and by not requiring each mobile terminal to broadcast its identity. This results in a reduction in the number of receivers on each base station and a reduction in the length of the synchronization message.

16 Claims, 5 Drawing Sheets

MEDIUM ACCESS CONTROL SCHEME FOR DATA TRANSMISSION ON CODE DIVISION MULTIPLE ACCESS (CDMA) WIRELESS SYSTEMS

FIELD OF THE INVENTION

The present invention relates to the use of code division multiple access to support data transmission systems. More particularly, the present invention relates to wireless access synchronization techniques to support integrated services in third generation personal communications systems and as the wireless access technology for local area networks.

DESCRIPTION OF RELATED ART

Code division multiple access (CDMA) systems, also known as CDMA wireless access systems, are comprised of a plurality of base stations interconnected by one or more switching systems. Each base station serves a particular geographic region referred to as a cell. Within each base station's cell are any number of mobile terminals. The function of each base station is to transmit data between its respective switching system and the mobile terminals assigned to its cell. The base station transmits the data to the mobile terminal over radio channels, which are also known as downlinks. Conversely, the mobile terminals communicate with their assigned base station over radio channels known as uplinks.

Typically, the base station maintains track of its assigned mobile terminals by continuously transmitting a pilot signal containing timing markers on a specific downlink channel. This continuous transmission allows the base station to maintain synchronization with its assigned mobile terminals. Such synchronization in turn enables the base station to transmit data to any given mobile terminal as needed.

In addition to achieving synchronization on the downlink channel for sending data, a base station also synchronizes with its assigned mobile terminals via the uplink channel to receive data by using a synchronization message. Synchronization messages are transmitted by a mobile terminal when it initiates a call. Like the pilot signal, the synchronization message also contains timing markers to which the receiver on the assigned base station synchronizes at the beginning of a call. Once the uplink channel from the mobile terminal to the base station is established, the base station uses additional timing information contained in on-going transmissions from the connected mobile terminal to maintain synchronization.

The synchronization requirements and the procedures discussed above are specified in EIA/TIA standard IS-95, which is discussed in detail in the 1992 Qualcomm Incorporated's primer entitled "An Overview Of The Application Of Code Division Multiple Access (CDMA) To Digital Cellular Systems And Personal Cellular Networks."

One shortcoming of this widely used synchronization standard is that it only performs well in regard to voice services. For example, synchronization messages are inapplicable for other types of cellular services because such cellular services do not maintain frequent enough contact with their respective base station to maintain synchronization. Accordingly, if the system is used to provide packet data services, or any other services in which the mobile terminal to base station transmissions are infrequent bursts, the base station may lose synchronization with its mobile terminals.

Several methods have been proposed to avoid the loss of synchronization at the base station during packet data calls. For example, in an article entitled "Open Multi-Rate Radio Interface Architecture Based On CDMA", Proc. of 2nd International Conference on Universal Personal Communications, pp. 985–89, October 1993, A. Baier disclosed a method in which mobile terminals continually transmit a low bit rate physical control signal to the base station between data bursts. The base station would in turn use the physical control signal to maintain synchronization with the terminal between data bursts. This method is referred to in this patent application as the continuous transmission medium access control (CTX-MAC) scheme.

However, the CTX-MAC scheme is not very practical in that it requires the reservation of an uplink channel for each mobile terminal engaged in bursty data transmission. Accordingly, even if a mobile terminal's use of its assigned channel to transmit data bursts was very infrequent, the assigned channel could not be used by any other mobile terminal and in effect would be rendered useless whenever the assigned mobile terminal ceased transmitting. Additionally, the receiver on the base station must remain active at all times for each "on-off" source. An "on-off" source is one that alternates between periods when it transmits data and periods when it has no data to transmit.

A variation of the CTX-MAC scheme which serves on-off sources with small duty cycles, i.e., the ratio of the on-period to the off-period, can achieve considerable savings in base station hardware, such as eliminating individually assigned receivers, if the transmission from the individual mobile terminals is discontinued during the off-periods and the hardware is shared among different users. In order to implement this variation, which is known as the discontinuous transmission medium access control (DTX-MAC) scheme, a synchronization message must be transmitted at the beginning of each on-period to allow the base station to acquire synchronization with the transmitting mobile terminal. The synchronization message also serves to inform the base station that a particular mobile terminal intends to transmit. In this DTX-MAC scheme, all mobile terminals use the same PN code to send their synchronization message on the synchronization-reservation channel. Using the same PN code on the synchronization-reservation channel avoids the need for a separate receiver assigned to receive communications from a mobile terminal even though that mobile terminal is in the off mode. Even though there may be a need for more than one synchronization-reservation channel if the number of mobile terminals is large, the number of synchronization-reservation channels should be kept as small as possible in order to reduce complexity at the base station. Several protocols have been established to allow the single receiver to accept and process the numerous synchronization messages originating from the numerous mobile terminals. For example, one approach allows the mobile units to send synchronization messages in an asynchronous fashion, which is also known as the ADTX-MAC scheme. However, one of the shortcomings of the ADTX-MAC scheme is that collisions may occur among the numerous synchronization messages sent by their respective mobile terminals. At a given time only one mobile station can attempt to access the uplink to establish synchronization. If two or more mobile terminals transmit their synchronization messages, which the IS-95 standard refers to as a preamble, a collision occurs. If two or more of the mobile terminals have a relative delay of less than a chip duration, then destructive collisions occur and all terminals must retransmit at a later time. If all relative delays are greater than one chip duration, then depending on the receiver design used, the first arriving mobile terminal may be able to successfully synchronize but the second arriving mobile terminal will not be able to synchronize.

One example of destructive collision is taught by U.S. Pat. No. 5,394,391 (Chen) and U.S. Pat. No. 5,257,257 (Chen2), both of which disclose a method of controlling the operation of a packet switched CDMA telecommunication network. Both patents teach that the transmitting terminal begins its transmission routine by sensing whether or not the receiving terminal is busy. If the receiving terminal is free, the transmitting terminal initiates its transmission. However, because this sensing for activity is performed randomly, and accordingly so is the subsequent transmission, if a second mobile terminal begins transmitting at the same time, a destructive collision will most likely occur.

One method to reduce the probability of destructive collisions is taught by U.S. Pat. No. 5,295,152 (Gudmundson et al.). Although Gudmundson et al. teaches increasing the capacity of radiotelephone communication systems by eliminating interference to communication traffic caused by random access bursts from unconnected mobile stations, it does so by interrupting the communication traffic of other mobile stations using the same frequency at periodic intervals. Consequently, it does not allow multiple mobile transmitters to transmit in an orderly fashion.

Another method to reduce the probability of destructive collisions functions by delaying the synchronization message according to some probabilistic rule. However, the initial delay tends to propagate additional synchronization acquisition delays. Also, for mobile terminals operating with relative delays from the base station of more than a chip duration, the collision of the numerous synchronization messages will also result in added interference. These secondary interferences are referred to as interfering collisions.

One additional shortcoming of CDMA systems in general, and ADTX-MAC schemes in particular that must be resolved is that, because all the mobile terminals would use the same uplink channel, their synchronization message must include a field identifying each individual transmitting mobile terminal. Because the base station must then decode the identification field contained in the synchronization message before sending an acknowledgment to the sending mobile terminal, there are certain repercussions on performance. For example, the performance of the uplink is quite sensitive to the closed-loop power control. Since closed-loop power control is typically not established by the time the synchronization message is transmitted, the error rate in decoding the identification part of the synchronization message may be quite high. Consequently, the length of the synchronization message must be long enough to ensure that the mobile terminal's identification field is correctly decoded by the base station.

As evidenced by the above discussion, there are several interrelated shortcomings associated with the ADTX-MAC scheme. For example, the ADTX-MAC's performance depends on the number of synchronization-reservation channels required to establish uplinks for all the mobile terminals. In turn, the number of synchronization-reservation channels required depends significantly on the synchronization message traffic generated by the mobile terminals. Because the number of synchronization messages generated per unit of time by a given source is difficult to characterize, the ADTX-MAC scheme is inherently unstable due to the potential for destructive or interfering collisions. As a result of this uncertainty in the amount of synchronization traffic generated, not only is the system designer forced to under-dimension the system as a whole, the design of the protocol needed to stabilize the system also becomes more complicated.

In light of the foregoing, there is a need for a method or apparatus that can make more efficient use of uplink channels by sharing the uplink channels between several mobile terminals engaged in bursty data transmission.

SUMMARY OF INVENTION

Accordingly, the present invention is directed to a method and apparatus to acquire synchronization by a base station with a mobile terminal at the beginning of the on-period on the uplink channel which substantially overcomes one or more of the above mentioned problems arising from limitations and disadvantages of the related art.

To achieve these and other advantages and in accordance with the purpose of the invention, as embodied and broadly described, the invention is a method and apparatus for transmitting a synchronization message on an uplink channel which not only reduces the number of receivers on the base station but also avoids the need for identifying the mobile terminal transmitting the synchronization message, which as a consequence avoids collisions among other mobile terminals in the same cell and reduces interference.

It is to be understood that both the foregoing general description and the following descriptions are exemplary and explanatory and are intended to provide further explanation of the invention as claimed.

The accompanying drawings are included to provide a further understanding of the invention and are incorporated in and constitute a part of this specification, illustrate one of many embodiments of the invention and together with the description serve to explain the principles of the invention.

DETAILED DESCRIPTION OF THE INVENTION

Reference will now be made in detail to the present preferred embodiment of the invention, an example of which is illustrated in the accompanying drawings. This embodiment is a synchronous approach to the transmission of a synchronization message in order to overcome the shortcomings of the ADTX-MAC scheme described above. The preferred embodiment is synchronous discontinuous transmission MAC (SDTX-MAC)scheme in which a TDMA frame on a synchronous synchronization-reservation (SSR) channel on the reverse link is divided into short time slots, and each time slot is assigned to a mobile terminal.

Figure 1:
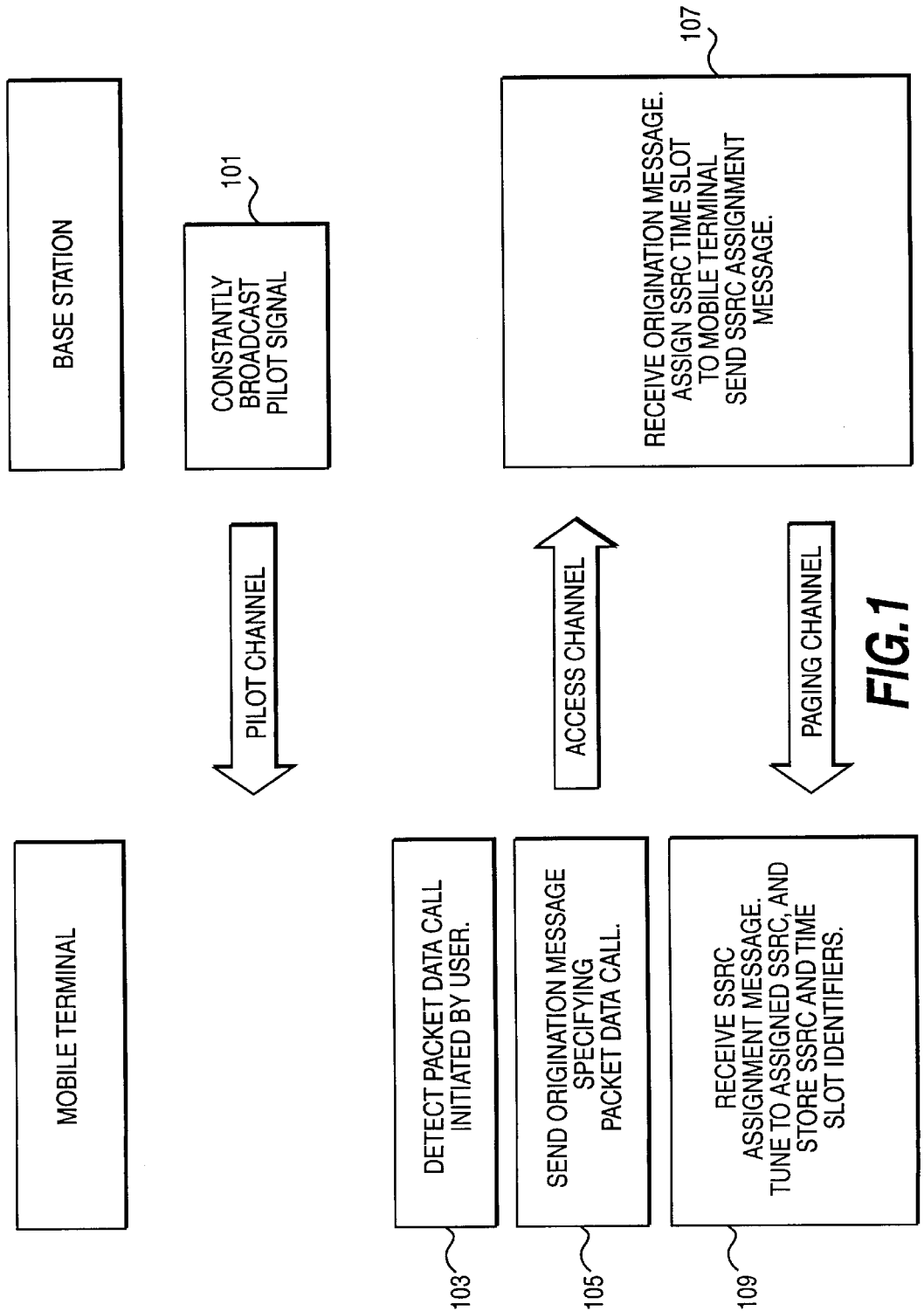
FIG. 1 is a schematic representation of the establishment of a synchronous synchronization-reservation channel.

The first step in establishing a SDTX-MAC scheme is depicted in FIG. 1. In such a depiction which, for example can be applied to a mobile telephone system, the base station maintains constant contact with its assigned mobile terminals by constantly broadcasting, as shown in step 101, a pilot signal on the downlink pilot channel. The user initiates, as shown in step 103, a transmission from the mobile terminal to the base station by powering on the mobile terminal. Once powered on and the message is ready to be sent, the mobile terminal registers with the base station by broadcasting, as shown in step 105, an origination message on one of the uplink access channels. Upon receiving the origination message, the base station broadcasts, as shown in step 107, an assignment message to the mobile terminal on one of the downlink paging channels. This assignment message consists of an SSR channel assignment and an assigned time slot on the assigned SSR channel for use by the mobile terminal in communicating with the base station.

Upon receiving the assignment message, the mobile terminal tunes its transmitter, as shown in step 109, to its assigned SSR channel, and stores both the SSR channel identifier and the time slot identifier in memory. The mobile terminal is now prepared to begin its data burst transmission to the base station.

Figure 2:
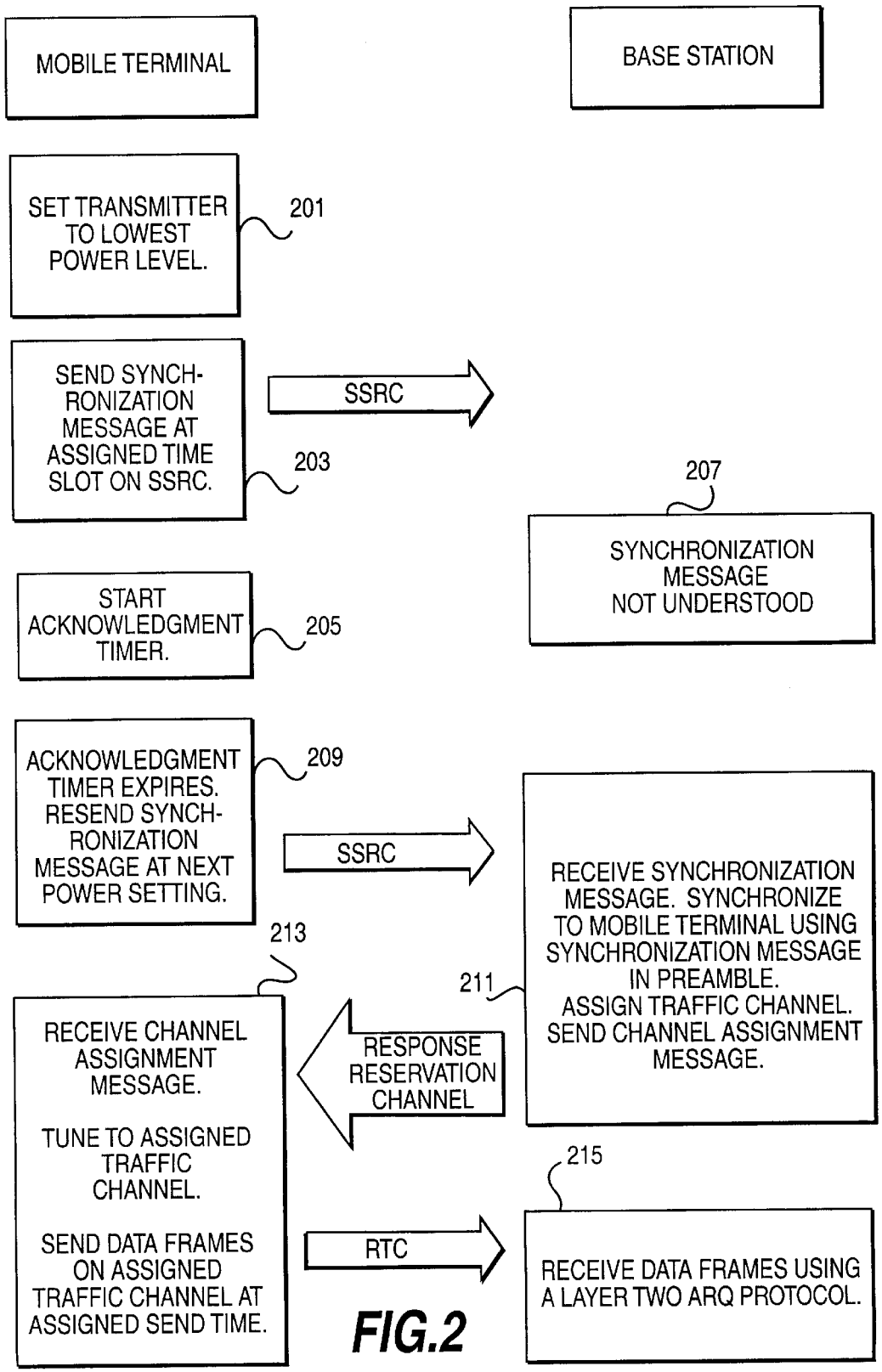
FIG. 2 is a schematic representation of a call initiation algorithm.

FIG. 2 shows how a mobile terminal achieves packet data transmission on the uplink. As depicted in FIG. 2, each mobile terminal is initially programmed to operate, as shown in step 201, at its lowest power setting. Then using the information contained in the assignment message, the mobile terminal's transmitter broadcasts, as shown in step 203, a synchronization message to the base station on the assigned SSR channel at the assigned time slot.

Once the mobile terminal broadcasts the synchronization message, an acknowledgement timer begins to run as shown in step 205. If the base station does not send an acknowledgement message within a period of time set by the mobile terminal, as shown in step 207, the acknowledgement timer expires. If the acknowledgement timer does expire as shown in step 209, the power setting of the mobile terminal's transmitter is increased by X dB where (0<X<7) dB. After the power level is reset the message is rebroadcast, and the acknowledgement timer begins again.

Once the base station receives the synchronization message it synchronizes to the mobile terminal using the preamble in the synchronization message and then sends, as shown in step 211, an acknowledgment to the mobile terminal. This acknowledgment is in the form of a channel assignment message containing a traffic channel and a send time. The channel assignment message is then broadcast by the base station to the mobile terminal on a response reservation channel (RR). Alternatively the paging channel could be used to broadcast the channel assignment message as well.

Upon receiving the channel assignment message, the mobile terminal tunes its transmitter to the assigned traffic channel and at the assigned send time transmits, as shown in step 213, its data frames to the base station on a reverse traffic channel. A layer two ARQ (Automatic Repeat reQuest) protocol may be used to ensure that the data frames are received correctly and in sequence, as shown in step 215.

Figure 3:
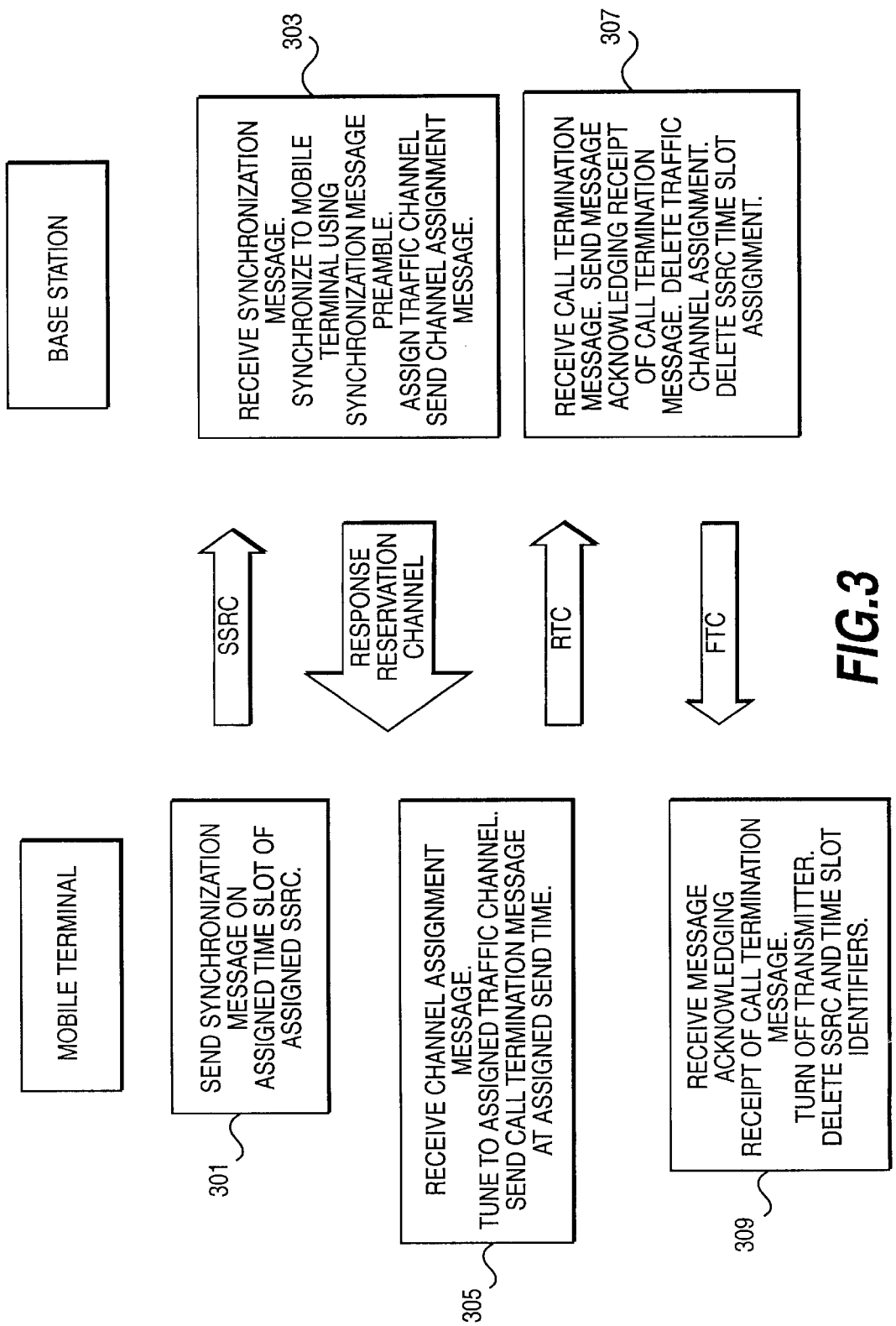
FIG. 3 is a schematic representation of a call termination algorithm.

FIG. 3 depicts the call termination mode which begins with the mobile terminal using the time slot assigned in the assignment message to broadcast, as shown in step 301, a synchronization message on the SSR channel to the base station. Once the base station receives the synchronization message, the base station uses the preamble in the synchronization message broadcast by the mobile terminal to synchronize, as shown in step 303, with the mobile terminal. The base station then assigns a traffic channel and a transmit time to the mobile terminal in a channel assignment message. This channel assignment message is subsequently broadcast on a response reservation channel by the base station to mobile terminal.

Upon receiving the channel assignment message, the mobile terminal tunes its transmitter to the assigned traffic channel and at the assigned send time transmits its call termination message on a reverse traffic channel to the base station, as shown in step 305. Upon receiving the call termination message, the base station broadcasts, as shown in step 307, an acknowledgement message to the mobile terminal on a forward traffic channel, and then deletes both the traffic channel and the SSR channel time slot assignments for that particular mobile terminal. Finally, upon receiving the message from the base station acknowledging the receipt of the call termination message, the mobile terminal, as shown in step 309, turns off its transmitter and deletes both its SSR channel assignment and its time slot assignment, thereby terminating the call.

Figure 4:
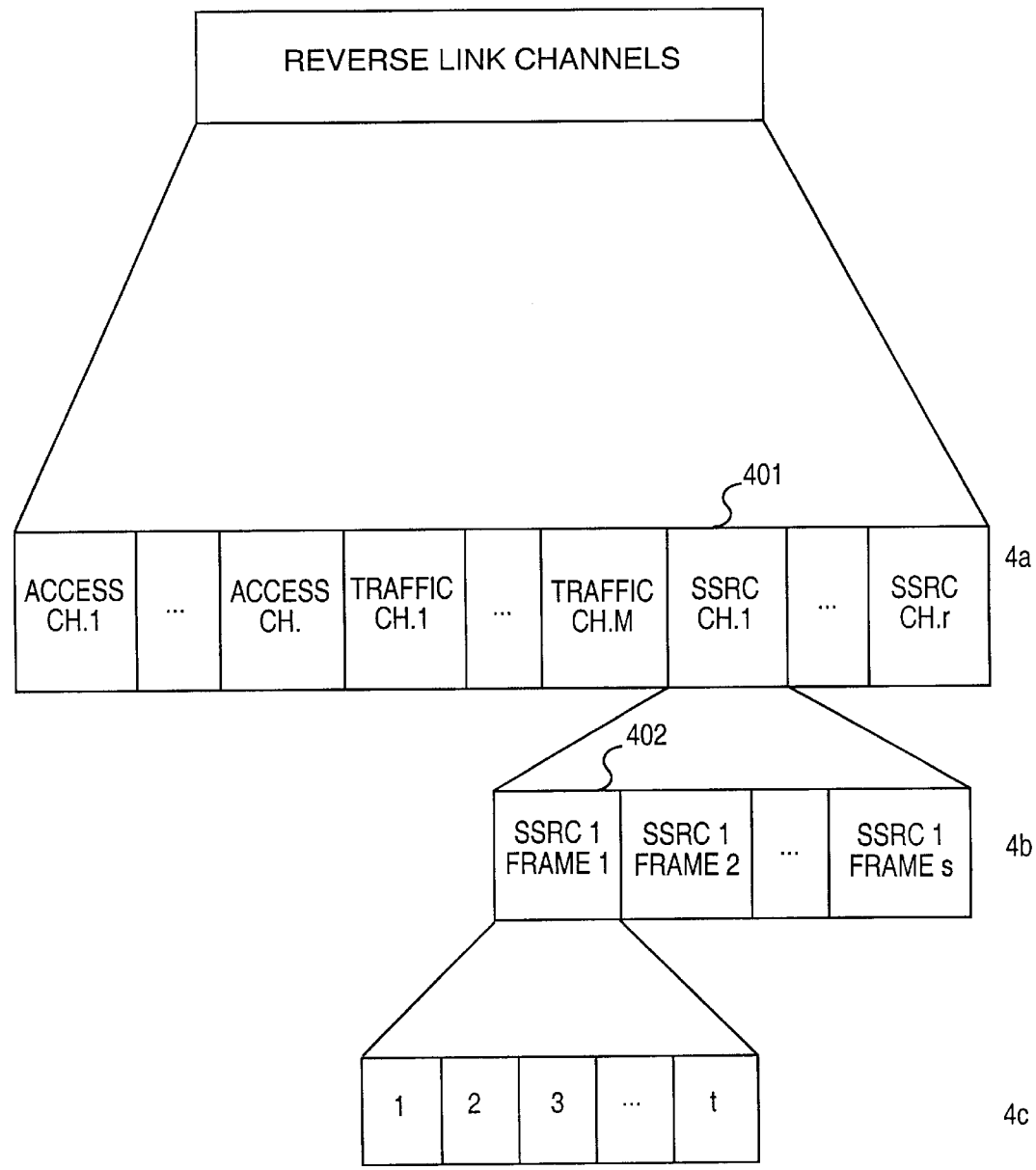
FIG. 4 is a schematic representation of the format of the synchronization-reservation channel on the reverse link.

Particular attention is now paid in FIG. 4 to the way the frames on the SSR channel are divided first into frames and then into time slots. For example, FIG. 4a depicts the format of all the reverse TDMA channels on which the mobile terminal can broadcast, including the r SSR channels. FIG. 4b depicts the first SSR channel 401 further divided into s frames. FIG. 4c depicts the first frame of the first SSR channel 402 further divided into a series of t consecutive time slots.

As discussed above, the preferred embodiment of the invention functions by assigning a time slot on a certain SSR channel to each mobile terminal during the call orientation period. It should be noted that the SSR channel frame repeats itself after t SSR channel time slots.

An SSR channel PN code, or SSRC-PN, is assigned for each SSR channel in a sector of a given cell in which the mobile terminals are located. An SSRC-PN is a short code which is transmitted by the mobile terminal on its assigned SSR channel time slot. Because the same PN code is used on the SSR channel by all the mobile terminals in the same sector, only one receiver is required for every SSR channel used.

Since there is a one to one correspondence between the time slots of the SSR channel and the mobile terminals, it is not necessary that the mobile terminal's identity be transmitted in the time slot. Accordingly, the preamble transmitted on the SSR channel by a mobile terminal only needs to be long enough to provide initial synchronization. This results in the SSR channel time slots being long enough to allow k repetitions of the SSRC-PN in one time slot.

Therefore, when the mobile terminal transmits its preamble on its assigned SSR channel time slot, it will consist of k repetitions of the SSRC-PN. The reason for transmitting the preamble k times is to allow the base station to first detect energy on the SSR channel time slot so it can then acquire synchronization with the mobile terminal. A long PN code that differentiates different sectors is used to mask the SSRC-PN before transmission of the preamble on the time slot.

Figure 5:
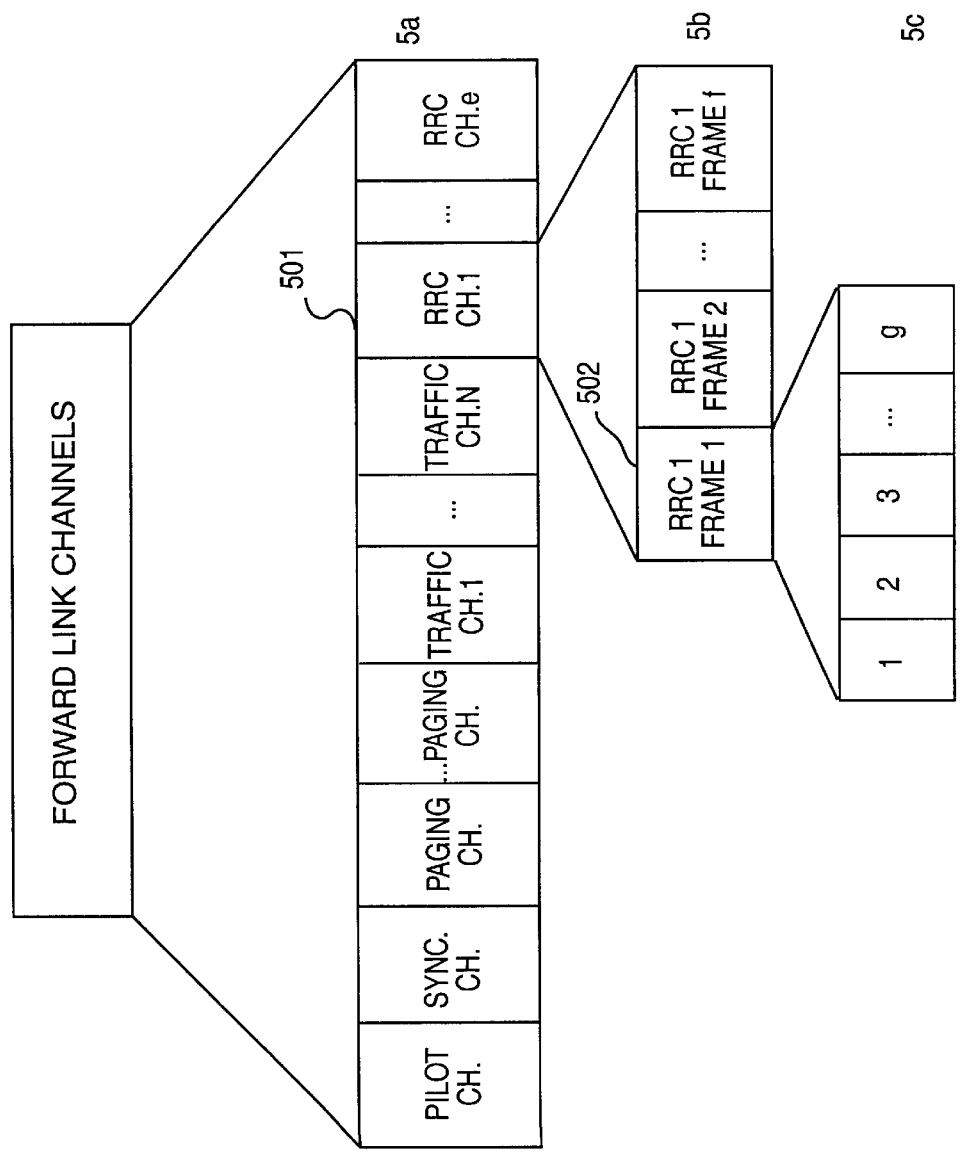
FIG. 5 is a schematic representation of the format of the reservation response channel on the forward link.

Once the base station detects energy on a given SSR channel time slot, thereby determining that the corresponding terminal is attempting to transmit data, the base station in turn transmits a message on one of the reservation response (RR) channels. FIG. 5 is a representation of the breakdown of the typical channels found on a forward link. For example, FIG. 5a depicts the format of all the forward link channels, including the e RR channels on which the base stations can broadcast. FIG. 5b depicts the first RR channel 501 divided into f frames. FIG. 5c depicts the first frame of the first RR channel 502 further divided into a series of g consecutive time slots.

It should be noted that the number of time slots on an RR channel may be larger or smaller than the number of time slots on the SSR channel. The mobile terminal is assigned to an RR channel time slot at the call setup time, and is used by the base station to respond to the reservation request sent by the mobile terminal on the SSR channel time slot. The RR channel time slot can also be used by the base station to inform the mobile terminal when there is a request on the network side of the system for transmission of data to the terminal. Whenever the mobile terminal receives a message on the RR channel time slot, it knows to begin sensing the traffic channel on the forward link based on information received in the message on the RR time slot.

Note that the RR channel may be designed so that the base station only transmits k repetitions of an RR channel PN code (RRC-PN) so as to allow the terminal to receive energy on its assigned RR channel time slot which then directs the terminal to the forward link traffic channel to receive messages. The RR channel may also be designed to include a short message.

As an example, consider an SSR channel which is 20 msec long and is divided into 48 time slots. Assuming a PN code with period 128 is used, 32 periods of the PN code may be fit into one time slot. In order to take into account the round trip propagation delay between the mobile terminal and the base station unit, the PN code should be repeated 31 times within the minislot.

Simulation results indicate that 37% of the time the synchronization delay is 20 msec (one transmission attempt), 36% of the time the synchronization delay is 40 msec, 18% of the time the synchronization delay is 60 msec, 6% of the time the synchronization delay is 80 msec, and 3% of the time the synchronization delay is 100 msec. Accordingly, the present invention has lower access delay, higher throughput, reduced base station complexity, and is robust to traffic variations.

Two types of handoffs may occur during a packet data call. If the terminal is in the process of data transmission and is put in soft handoff with other cells/sectors or a hand handoff is carried out, the base station will send a new synchronization channel assignment message to the terminal through the traffic channel. The message specifies a new synchronization channel, a time slot and a sector by which the mobile terminal will make future access attempts. If the terminal is not on a traffic channel, i.e. it is in idle mode and carries out an idle handoff according to the IS-95 standard to another sector, then the terminal will be required to relinquish both its synchronization channel and its time slot on the old cell/sector, and then obtain a new synchronization channel and time slot on the new cell.

It will be apparent to those skilled in the art that various modifications and variations can be made to the algorithm of the present invention without departing from the spirit or scope of the invention. Thus, it is intended that the present invention cover the modifications and variations of this invention provided they come within the scope of the appended claims and their equivalents.

What is claimed:

1. A code division multiple access (CDMA) communication system comprising a base station and a plurality of assigned mobile terminals coupled at least one said base station, wherein said base station communicates with said plurality of assigned mobile terminals using at least one transmitter and at least one receiver to transfer at least one of many data bursts, and said transmitter and receiver communicate using a plurality of communication channels comprising:

forward link channels which include a pilot channel, a synchronization channel, at least one paging channel, at least one forward traffic channel, and at least one reservation response channel;

reverse link channels which include at least one access channel, at least one reverse traffic channel, and at least one synchronous synchronization-reservation channel; and means for establishing a communication link between said base station and said plurality of assigned mobile terminals.

2. A code division multiple access (CDMA) communication system as recited in claim 1, wherein said means for establishing a communication link further comprises:

means for maintaining contact between said base station and a first of said plurality of assigned mobile terminals;

means for synchronizing transmissions between said base station and the first of said plurality of assigned mobile terminals;

means for adjusting the transmitting power of the first of said plurality of assigned mobile terminals so as to allow the transfer of said data bursts; and means for terminating said communications link.

3. A code division multiple access (CDMA) communication system as recited in claim 2 wherein said synchronous synchronization-reservation channels transmit a PN code identifying the sector of the cell that the transmitting mobile terminal is in.

4. A code division multiple access (CDMA) communication system as recited in claim 3 wherein said synchronous synchronization-reservation channels for transmitting a preamble are each divided into a plurality of frames and said frames are further divided into a plurality of time slots, each said time slots corresponding to an individual mobile terminal.

5. A code division multiple access (CDMA) communication system as recited in claim 4 wherein said preamble transmitted on assigned synchronization-reservation channel time slot comprises at least one repetition of the PN code in one time slot.

6. A code division multiple access (CDMA) communication system as recited in claim 5 wherein said base station synchronizes to said mobile terminal using said preamble, and said base station transmits a channel assignment message on one of said reservation response channels.

7. A code division multiple access (CDMA) communication system as recited in claim 5 wherein the mobile terminal uses said channel assignment message to transmit data at the assigned time slot.

8. A method of operating a code division multiple access (CDMA) communication system comprised of a plurality of mobile terminals operating in sector of a cell which is assigned to a base station, wherein said base station communicates with said plurality of assigned mobile terminals using at least one transmitter and at least one receiver to transfer at least one of many data bursts, the method comprising the steps of:

maintaining a constant link between said base station and said plurality of mobile terminals with a pilot signal;

accessing said base station by a first of said mobile terminals with an origination message;

assigning a synchronous synchronization-reservation channel time slot to the first mobile terminal by said base station in response to said origination message;

synchronizing the first mobile terminal with said base station using said assigned time slot;

sending a channel assignment message to the first mobile terminal after the base station synchronizes with the first mobile terminal;

broadcasting data frames from said plurality of mobile terminals to said base station on a traffic channel designated by said channel assignment message sent by said base station; and turning off said transmitter of said first mobile terminal once said broadcasting is completed by said first mobile terminal.

9. A method of operating a code division multiple access (CDMA) communication system according to claim 8 wherein said accessing step comprises the sub-steps of:

sending said origination message from said first mobile terminal to said base station wherein said origination message contains packet data; and receiving said origination message sent by said first mobile terminal at said base station.

10. A method of operating a code division multiple access (CDMA) communication system according to claim 9 wherein said assigning step comprises the sub-steps of:

setting aside said synchronous synchronization-reservation channel time slot and a channel assignment for use by said first mobile terminal in an assignment message by said base station;

transmitting said assignment message from said base station to said first mobile terminal; and receiving said assignment message at said first mobile terminal.

11. A method of operating a code division multiple access (CDMA) communication system according to claim 10 wherein said synchronizing step comprises the sub-steps of:

tuning said transmitter of said first mobile terminal to said channel assignment assigned in said assignment message;

transmitting a synchronization message from said first mobile terminal to said base station at said assigned time slot and on said synchronous synchronization-reservation channel contained in said assignment message;

receiving said synchronization message sent by said first mobile terminal at said base station; and synchronizing said base station to the mobile using a preamble contained in said synchronization message sent by said first mobile terminal.

12. A method of operating a code division multiple access (CDMA) communication system according to claim 11 wherein said transmitting step comprises the sub-steps of:

assigning a reverse traffic channel and a send time to said first mobile terminal in said channel assignment message;

transmitting said channel assignment message from said base station to said first mobile terminal using a reservation response channel;

receiving said channel assignment message at said first mobile terminal on said reservation response channel; and tuning said transmitter on said first mobile terminal to said reverse traffic channel assigned in said assignment message.

13. A method of operating a code division multiple access (CDMA) communication system according to claim 12 wherein said broadcasting step comprises the sub-steps of:

transmitting from said first mobile terminal at least one of a plurality of data frames on assigned said reverse traffic channel designated by channel assignment message to said base station; and receiving said at least one data frame at said base station transmitted by said first mobile terminal.

14. A method of operating a code division multiple access (CDMA) communication system according to claim 12 wherein said transmitting sub-step comprises transmitting a PN code identifying the sector of the cell the said mobile terminal is transmitting from which results in a reduction of the number of receivers the base station is required to have.

15. A method of operating a code division multiple access (CDMA) communication system as recited in claim 14 wherein said sending sub-step further comprises dividing said synchronous synchronization-reservation channels into a plurality of frames;

subdividing said plurality of frames into a plurality of time slots;

assigning each of said mobile terminals to a corresponding time slot; and transmitting a preamble on said assigned synchronization-reservation channel time slot during said assigned time slot.

16. A method of operating a code division multiple access (CDMA) communication system as recited in claim 15 wherein said transmitting sub-step comprises repeating a PN code at least once in said one time slot.

* * * * *